US009790732B2

(12) United States Patent
Free et al.

(10) Patent No.: US 9,790,732 B2
(45) Date of Patent: Oct. 17, 2017

(54) METHODS OF TRANSFERRING PILLARS FROM PILLAR DELIVERY FILMS

(71) Applicant: 3M INNOVATIVE PROPERTIES COMPANY, St. Paul, MN (US)

(72) Inventors: Michael Benton Free, St. Paul, MN (US); Martin B. Wolk, Woodbury, MN (US); Terry O. Collier, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/294,085

(22) Filed: Oct. 14, 2016

(65) Prior Publication Data
US 2017/0028693 A1    Feb. 2, 2017

Related U.S. Application Data

(62) Division of application No. 14/025,931, filed on Sep. 13, 2013, now Pat. No. 9,587,425.

(51) Int. Cl.
*E06B 3/00*    (2006.01)
*B32B 17/00*    (2006.01)
(Continued)

(52) U.S. Cl.
CPC .......... *E06B 3/67304* (2013.01); *B29C 43/00* (2013.01); *B32B 17/00* (2013.01);
(Continued)

(58) Field of Classification Search
CPC ..... E06B 3/00; E06B 3/60; E06B 3/67; E06B 3/67; E06B 3/673; E06B 3/673;
(Continued)

(56) References Cited

U.S. PATENT DOCUMENTS 4,458,412 A    7/1984    Dean
4,753,061 A    6/1988    Braden
(Continued)

FOREIGN PATENT DOCUMENTS

EP    1004552    5/2000
JP    2000-086307    3/2000
(Continued)

OTHER PUBLICATIONS

Collins, "Measurement of local heat flow in flat evacuated glazing", Int J Heat Mass Transfer, 1993, vol. 36, No. 10, pp. 2553-2563.
(Continued)

*Primary Examiner* — Jacob T Minskey
*Assistant Examiner* — Matthew Hoover

(57) ABSTRACT

Pillar delivery films for vacuum insulated glass units are disclosed. The delivery films include a support film or pocket tape, a sacrificial material on the support film, and a plurality of pillars. The pillars are at least partially embedded in the sacrificial material or formed within sacrificial material molds, and the sacrificial material is capable of being removed while leaving the pillars substantially intact. Methods of transferring pillars to a substrate using the pillar delivery films are disclosed. In order to make an insulated glass unit, the delivery films are laminated to a receptor such as a glass pane, and the support film and sacrificial material are removed to leave the pillars remaining on the glass.

8 Claims, 15 Drawing Sheets

(51) Int. Cl.
*B29C 43/00* (2006.01)
*B32B 37/00* (2006.01)
*B32B 38/00* (2006.01)
*E06B 3/673* (2006.01)
*B32B 37/15* (2006.01)
*E06B 3/663* (2006.01)
*E06B 3/66* (2006.01)
*B32B 37/12* (2006.01)
*B32B 38/10* (2006.01)

(52) U.S. Cl.
CPC ............ *B32B 37/025* (2013.01); *B32B 37/12* (2013.01); *B32B 37/15* (2013.01); *B32B 38/10* (2013.01); *E06B 3/663* (2013.01); *E06B 3/6612* (2013.01); *E06B 3/66304* (2013.01); B32B 2305/72 (2013.01); B32B 2419/00 (2013.01); Y10T 428/24802 (2015.01); Y10T 428/24926 (2015.01)

(58) Field of Classification Search
CPC ........ E06B 3/673; E06B 3/67304; E06B 3/66; E06B 3/66; E06B 3/661; E06B 3/6612; E06B 3/663; E06B 3/663; E06B 3/663; E06B 3/66304; B29C 43/00; B32B 17/00; B32B 37/00; B32B 37/02; B32B 37/02; B32B 37/025; B32B 37/10; B32B 37/12; B32B 37/15; B32B 38/00; B32B 38/10
See application file for complete search history.

(56) References Cited

U.S. PATENT DOCUMENTS

| | | | |
|---|---|---|---|
| 4,938,802 A * | 7/1990 | Noll | ........................ B22C 9/10 106/38.2 |
| 5,107,649 A | 4/1992 | Benson | |
| 5,124,185 A | 6/1992 | Kerr | |
| 5,872,395 A * | 2/1999 | Fujimoto | .............. H01L 21/565 257/667 |
| 5,891,536 A | 4/1999 | Collins | |
| 6,083,578 A | 7/2000 | Collins | |
| 6,212,852 B1 | 4/2001 | Tsai | |
| 6,326,067 B1 | 12/2001 | Veerasamy | |
| 6,387,460 B1 | 5/2002 | Shukuri | |
| 6,402,452 B1 | 6/2002 | Miller | |
| 6,420,002 B1 | 7/2002 | Aggas | |
| 6,479,112 B1 | 11/2002 | Shukuri | |
| 6,692,600 B2 | 2/2004 | Veerasamy | |
| 6,955,026 B2 | 10/2005 | Misonou | |
| 8,082,660 B2 | 12/2011 | Lu | |
| 8,142,531 B2 | 3/2012 | Adefris | |
| 8,181,336 B2 | 5/2012 | Chow | |
| 8,221,857 B2 | 7/2012 | Jaeger | |
| 2004/0076801 A1* | 4/2004 | Haataja | .................... B27N 3/04 428/174 |
| 2004/0189855 A1 | 9/2004 | Takasaki | |
| 2005/0156362 A1* | 7/2005 | Arnold | .................. C04B 41/009 264/618 |
| 2008/0006922 A1 | 1/2008 | Gutentag | |
| 2010/0104807 A1 | 4/2010 | Chiu | |
| 2010/0260950 A1 | 10/2010 | Tang | |
| 2013/0101759 A1 | 4/2013 | Jones | |
| 2015/0079313 A1 | 3/2015 | Vogel-Martin | |
| 2015/0164746 A1 | 6/2015 | Costello | |

FOREIGN PATENT DOCUMENTS

| | | |
|---|---|---|
| JP | 2005-200301 | 7/2005 |
| JP | 10507500 | 3/2010 |
| WO | WO 2005/054148 | 6/2005 |

OTHER PUBLICATIONS

Knuesel, "Self-Assembly and Self-Tiling: Integrating Active Dies Across Length Scales on Flexible Substrates", J. Microelectro Mechanical System, Feb. 2012, vol. 21, No. 1, pp. 85-99.

Stauth, "Self-assembled single-crystal silicon circuits on plastic", PNAS, Sep. 19, 2006, vol. 130, No. 38, pp. 13922-13927.

Zala, "Techniques for Powder Particle Coating: A Review", International Journal of Pharma World Research, Jan.-Mar. 2011, vol. 2, No. 1, pp. 1-18.

PCT International Search Report for PCT/US2014/055136, dated Dec. 23, 2014.

* cited by examiner

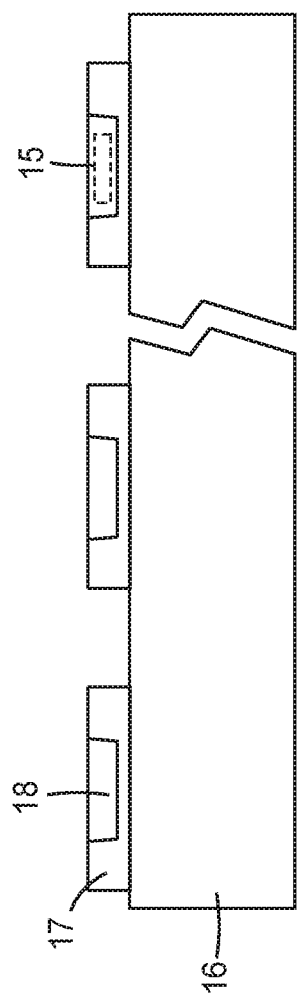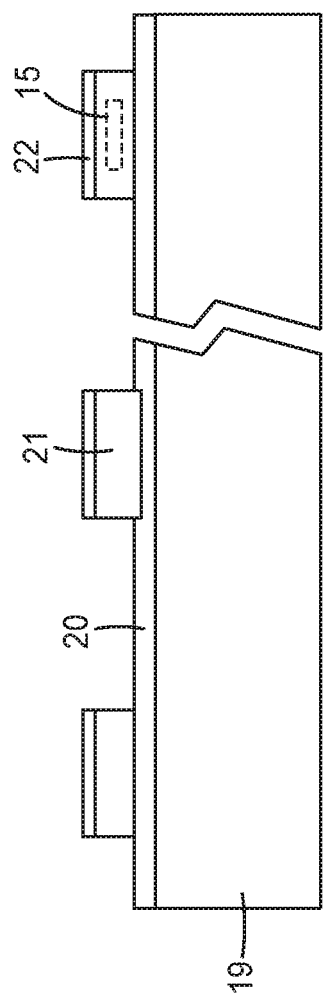

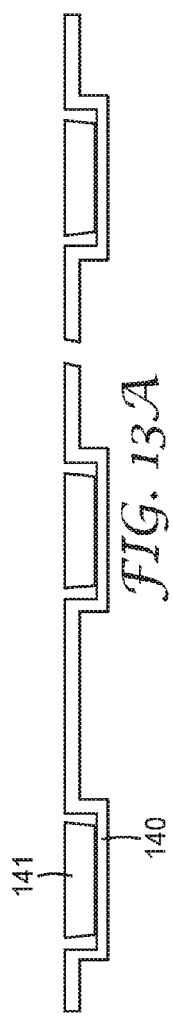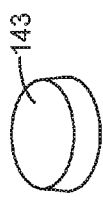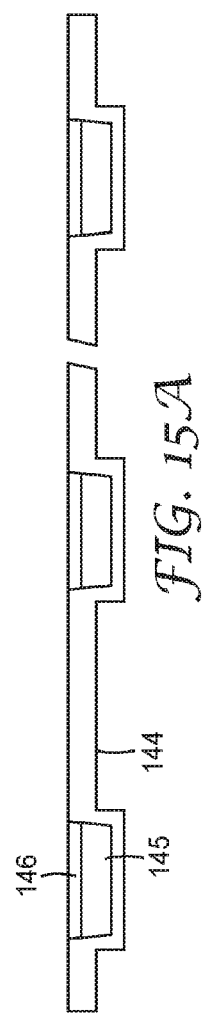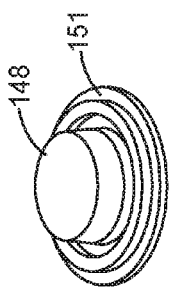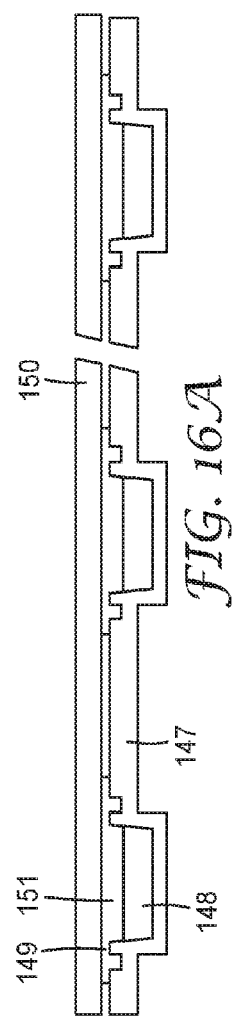

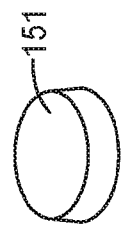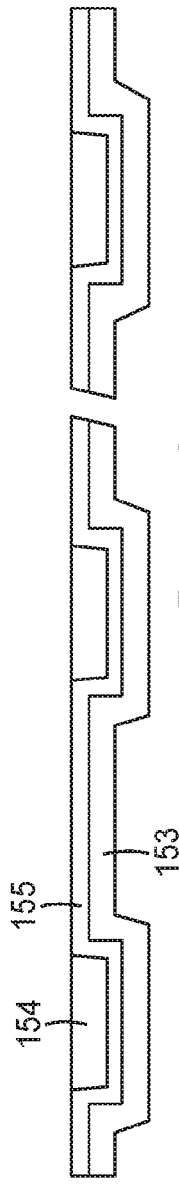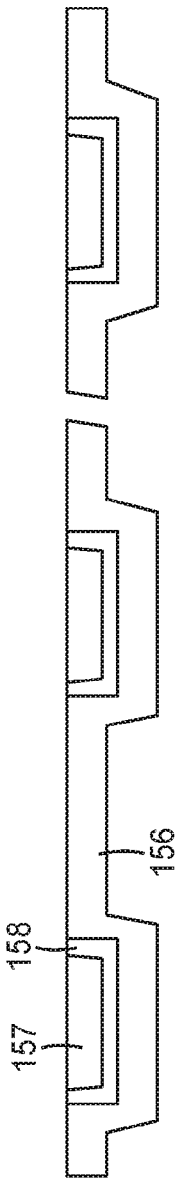

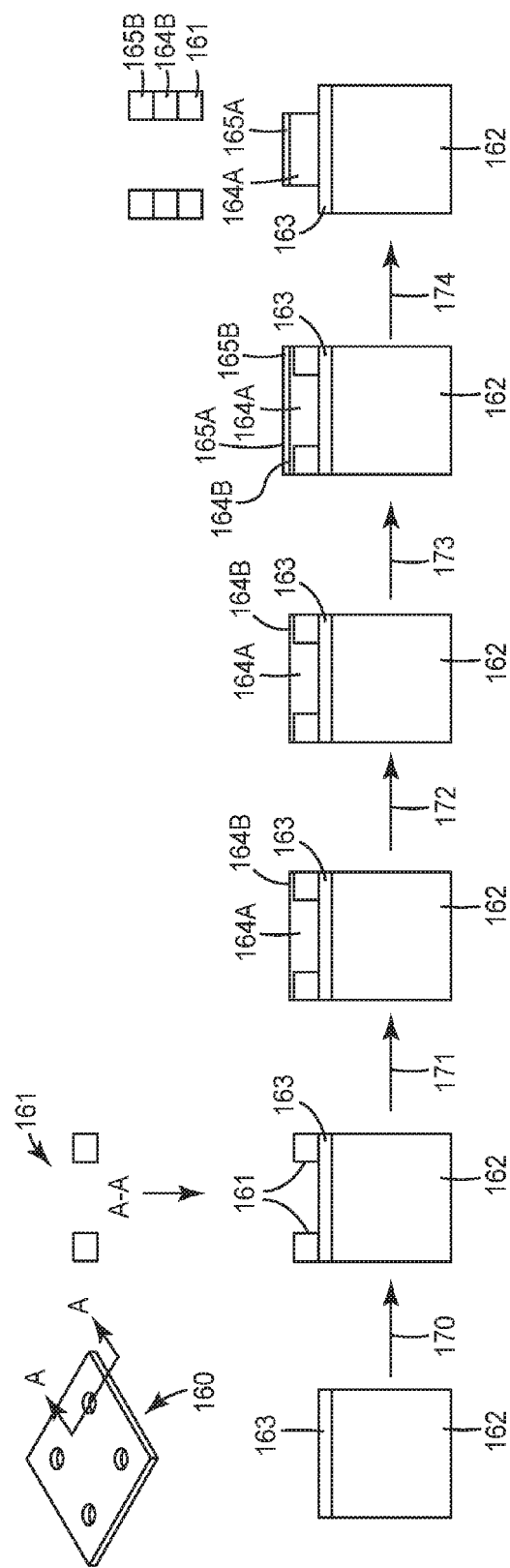

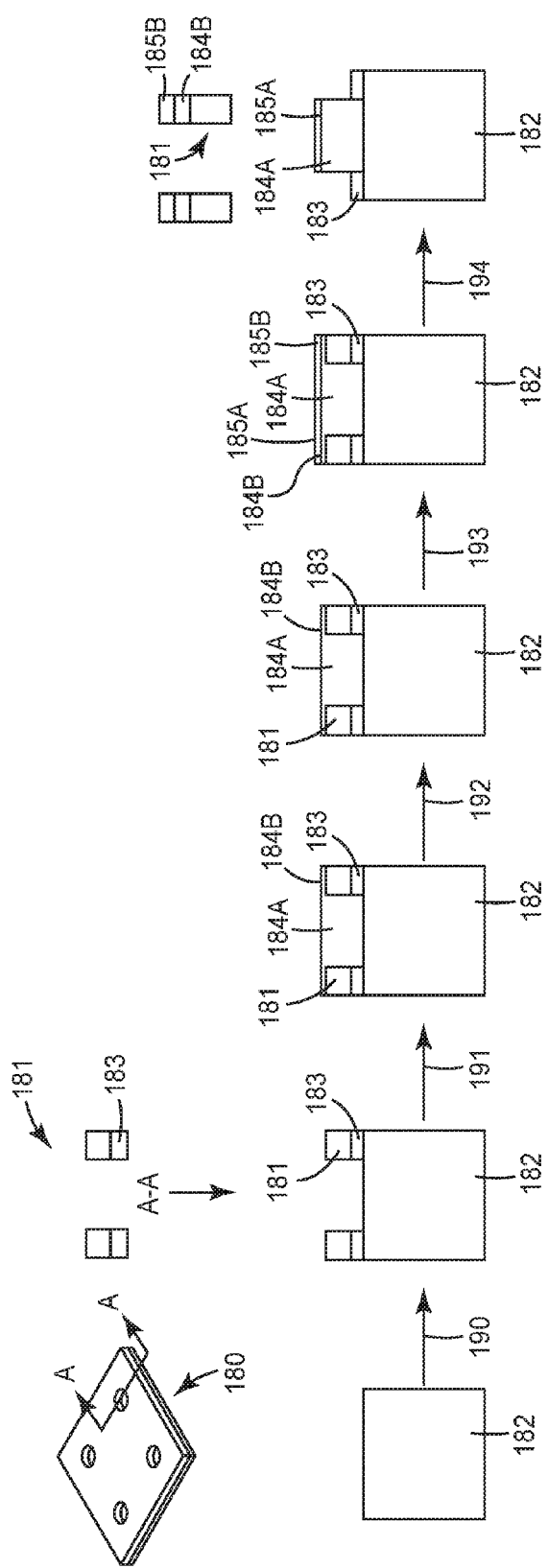

METHODS OF TRANSFERRING PILLARS FROM PILLAR DELIVERY FILMS

BACKGROUND

Windows are poor thermal insulators and contribute significantly to building heat loss and energy inefficiency. The need to meet green building standards is driving the adoption of energy efficient insulated glass units including vacuum designs. A vacuum insulated glass unit 10 is shown in FIGS. 1 and 2. Unit 10 includes two panes of glass 11 and 12 separated by a vacuum gap. Pillars 14 in the gap maintain the separation of glass panes 11 and 12, which are hermetically sealed together by an edge seal 13, typically a low melting point glass frit, surrounding the pillars. Manufacturing vacuum insulated glass units efficiently and cost effectively can present challenges, particularly with selection of suitable pillars, placement of the pillars, and sealing the glass panes together with the vacuum gap. Accordingly, a need exists for improved ways to make and install pillars for vacuum insulated glass units.

SUMMARY

A pillar delivery film, consistent with the present invention, includes a support film, a sacrificial material layer on the support film, and a plurality of pillars. Each pillar is at least partially embedded in the sacrificial material layer, which is capable of being removed from the pillars while leaving the pillars substantially intact.

Another pillar delivery film, consistent with the present invention, includes a support film, a plurality of molds on the support film, and a plurality of pillars located in the molds. The molds are composed of a sacrificial material, which is capable of being removed from the pillars while leaving the pillars substantially intact.

A pillar delivery pocket film, consistent with the present invention, includes a support film having a plurality of pockets formed within it and a plurality of pillars located in the pockets. The support film is composed of a sacrificial material, which is capable of being removed from the pillars while leaving the pillars substantially intact.

Another pillar delivery pocket film, consistent with the present invention, includes a support film having a plurality of pockets formed within it, a sacrificial material located within the pockets, and a plurality of pillars at least partially embedded in the sacrificial material in the pockets. The sacrificial material is capable of being removed from the pillars while leaving the pillars substantially intact.

A method for transferring pillars from a delivery film to a receptor surface, consistent with the present invention, includes providing a delivery film having a support film, a sacrificial material on the support film, and a plurality of pillars at least partially within the sacrificial material. The delivery film is laminated to a receptor surface with the pillars facing the receptor surface. The support film is removed while leaving the pillars on the receptor surface and at least a portion of the sacrificial material on the pillars. The sacrificial material is then removed while leaving the pillars remaining and substantially intact on the receptor surface.

A method for making a delivery film having pillars and transferring them to a receptor surface, consistent with the present invention, includes providing a support film with a releasable surface. A plurality of pillars are molded on the releasable surface of the support film using a mold applied to the releasable surface, and the mold is removed from the releasable surface while leaving the pillars substantially intact. The pillars are then transferred from the support film to a receptor surface.

BRIEF DESCRIPTION OF THE DRAWINGS

The accompanying drawings are incorporated in and constitute a part of this specification and, together with the description, explain the advantages and principles of the invention. In the drawings.

FIG. 3 is a diagram of a pillar delivery film for transfer to a sacrificial material layer;

FIG. 4 is a diagram of a pillar delivery film for transfer to a sacrificial material layer;

FIG. 13A is a side sectional view of pocket tape having pre-formed pillars;

FIG. 13B is a perspective view of the pillar resulting from the pocket tape of FIG. 13A;

FIG. 14A is a side sectional view of pocket tape having cured form-in-place pillars;

FIG. 14B is a perspective view of the pillar resulting from the pocket tape of FIG. 14A;

FIG. 15A is a side sectional view of pocket tape having cured form-in-place pillars with adhesive;

FIG. 15B is a perspective view of the pillar resulting from the pocket tape of FIG. 15A;

FIG. 16A is a side sectional view of pocket tape having cured form-in-place pillars with retention rings;

FIG. 16B is a perspective view of the pillar resulting from the pocket tape of FIG. 16A;

FIG. 17A is a side sectional view of sacrificial pocket tape having cured form-in-place pillars;

FIG. 17B is a perspective view of the pillar resulting from the pocket tape of FIG. 17A;

FIG. 18A is a side sectional view of carrier film and sacrificial pocket tapes having cured form-in-place pillars;

FIG. 18B is a perspective view of the pillar resulting from the pocket tape of FIG. 18A;

FIG. 19A is a side sectional view of a pocket tape having cured form-in-place pillars in sacrificial pockets;

FIG. 19B is a perspective view of the pillar resulting from the pocket tape of FIG. 19A;

FIG. 20 is a diagram of a pillar delivery film and method using a strippable tool;

FIG. 21 is a diagram of a pillar delivery film and method using a strippable tool with a sacrificial material layer;

DETAILED DESCRIPTION

Figure 1:
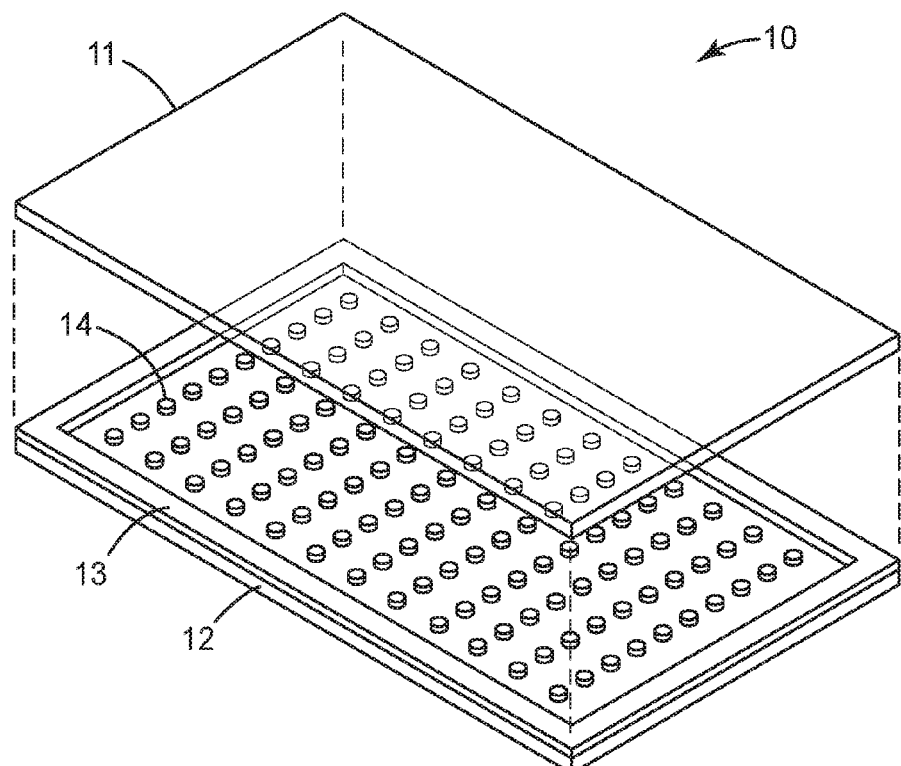
FIG. 1 is an exploded perspective view of a vacuum insulated glass unit.
Figure 2:
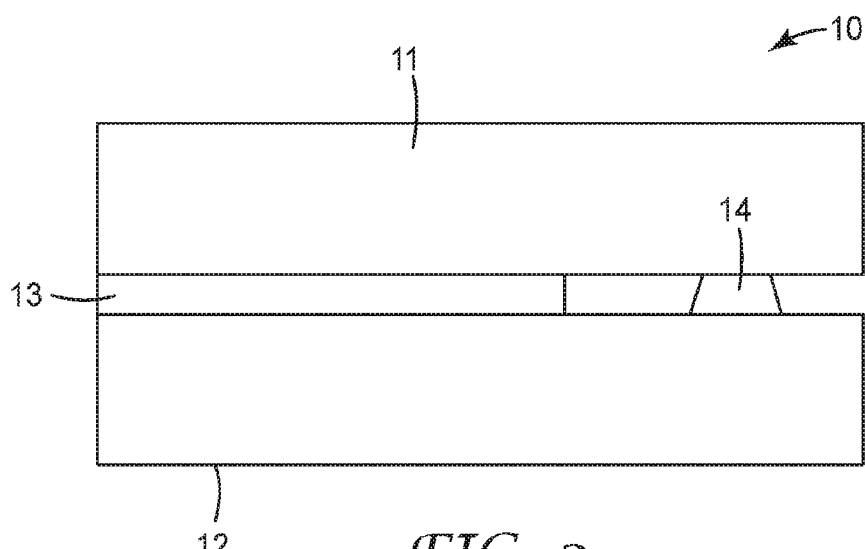
FIG. 2 is a side sectional view of a vacuum insulated glass unit.

Embodiments of the present invention include pillar delivery films and methods that can be used to provide the pillars required for fabrication of vacuum insulated glass units. The delivery films contain the pillars, and the methods can use the films to place the pillars on glass panes. One method involves mechanically depositing the pillars onto a pocket film or a film with a releasable surface and lamination transferring the pillars onto glass. Another method involves molding the pillars in place on a pocket film or a film with a releasable surface and mechanically transferring the pillars to glass. Another method involves molding the pillars in place on a pocket film or a film with a releasable surface and lamination transferring the pillars onto glass. The mechanical transfer of pillars, referred to as pick and place, can use robotics for the movement and placement of the pillars. The mold in place of the pillars and lamination transfer of them are described below. The methods can also deliver the edge seal in the glass units. The delivery films and methods can make use of lamination transfer films.

Examples of pillars for vacuum insulated glass units are described in U.S. patent application Ser. No. 14/025,958 of M. Vogel-Martin, entitled "Vacuum Glazing Pillars for Insulated Glass Units," and filed on same date herewith, (which is incorporated herein by reference as if fully set forth. Examples of lamination transfer films are described in U.S. patent application Ser. No. 13/553,987, entitled "Structured Lamination Transfer Films and Methods," and filed Jul. 20, 2012, which is incorporated herein by reference as if fully set forth.

FIG. 3 is a diagram of a pillar delivery film with a sacrificial material layer for transfer to glass. The delivery film includes a support film 16, a sacrificial resin material 17 forming molds, and form in place pillars 18. The pillars can optionally include a pre-formed pillar body 15.

FIG. 4 is a diagram of a pillar delivery film with a sacrificial material layer for transfer to glass. The delivery film includes a support film 19, a sacrificial resin material 20 can be a continuous or discontinuous layer on support film 19, pre-formed pillars 21, and an optional functional layer 22 on or around the pillars. As illustrated, pillars 21 can be on or at least partially embedded within material 20. The pillars can optionally include pre-formed pillar bodies 15.

Figure 5:
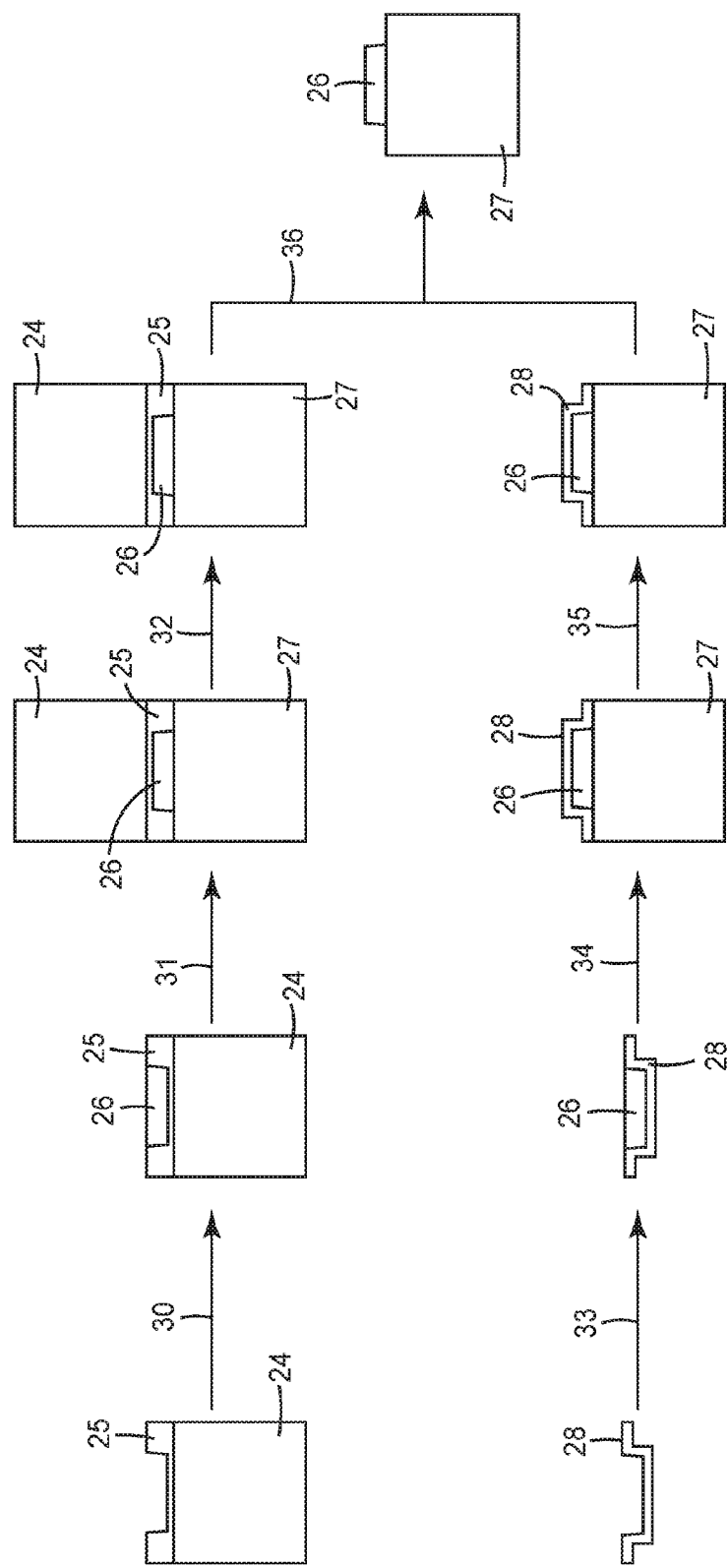
FIG. 5 is a diagram of a pillar delivery film and method for transfer directly to glass.

FIG. 5 is a diagram of a section of a pillar delivery film and method for transfer directly to glass. The delivery film includes a support film 24 having a mold 25. The mold is filled with a curable pillar resin 26 to form a filled mold on the support film (step 30). Alternatively a preformed pillar may be inserted into the mold before or after the curable resin fill. The support film is laminated to glass 27 (step 31), and the film and glass laminate is cured (step 32). Film 24 with mold 25 is removed (step 36), resulting in pillar 26 on glass 27. Alternatively, a molded pocket tape 28 can be used. Pocket tape 28 is filled with a curable pillar resin to form pillar 26 (step 33). The filled pocket tape 28 is laminated to glass 27 (step 34), and tape and glass laminate is cured (step 35). Pocket tape 28 is removed (step 36), resulting in pillar 26 on glass 27.

Figure 6:
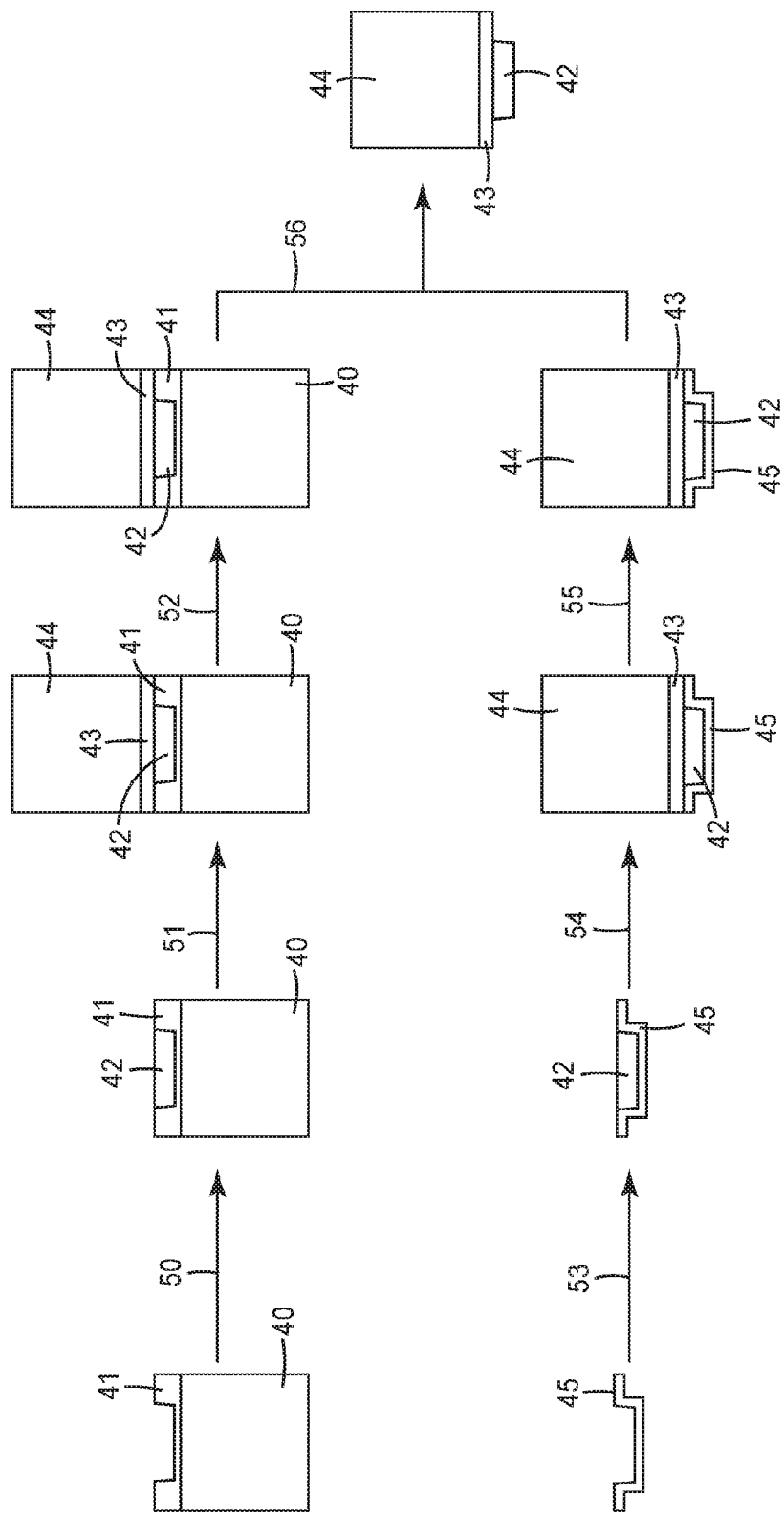
FIG. 6 is a diagram of a pillar delivery film and method for transfer to a sacrificial material layer.

FIG. 6 is a diagram of a section of a pillar delivery film and method with a sacrificial material layer for transfer to glass. Mold 41 can optionally be on mold support film 40. The mold is filled with a curable pillar resin 42 to form a filled mold (optionally on mold support film 40) (step 50). Mold 41 (or optionally mold support film 40) is laminated to transfer film 44 having a sacrificial material layer 43 (step 51), and the mold (optionally be on mold support film 40) and transfer film 44 laminate is cured (step 52). Mold 41 or optionally be on mold support film 40 is removed (step 56), resulting in pillar delivery film comprising pillar 42 on transfer film 44 with sacrificial material 43 between them. Alternatively, a molded pocket tape 45 can be used. Pocket tape 45 is filled with a curable pillar resin to form pillar 42 (step 53). The filled pocket tape 45 is laminated to transfer film 44 having sacrificial material layer 43 (step 54), and pocket tape and transfer film 44 laminate is cured (step 55). Pocket tape 45 is removed (step 56), resulting in pillar delivery film comprising pillar 42 on transfer film 44 with sacrificial material 43 between them.

Figure 7:
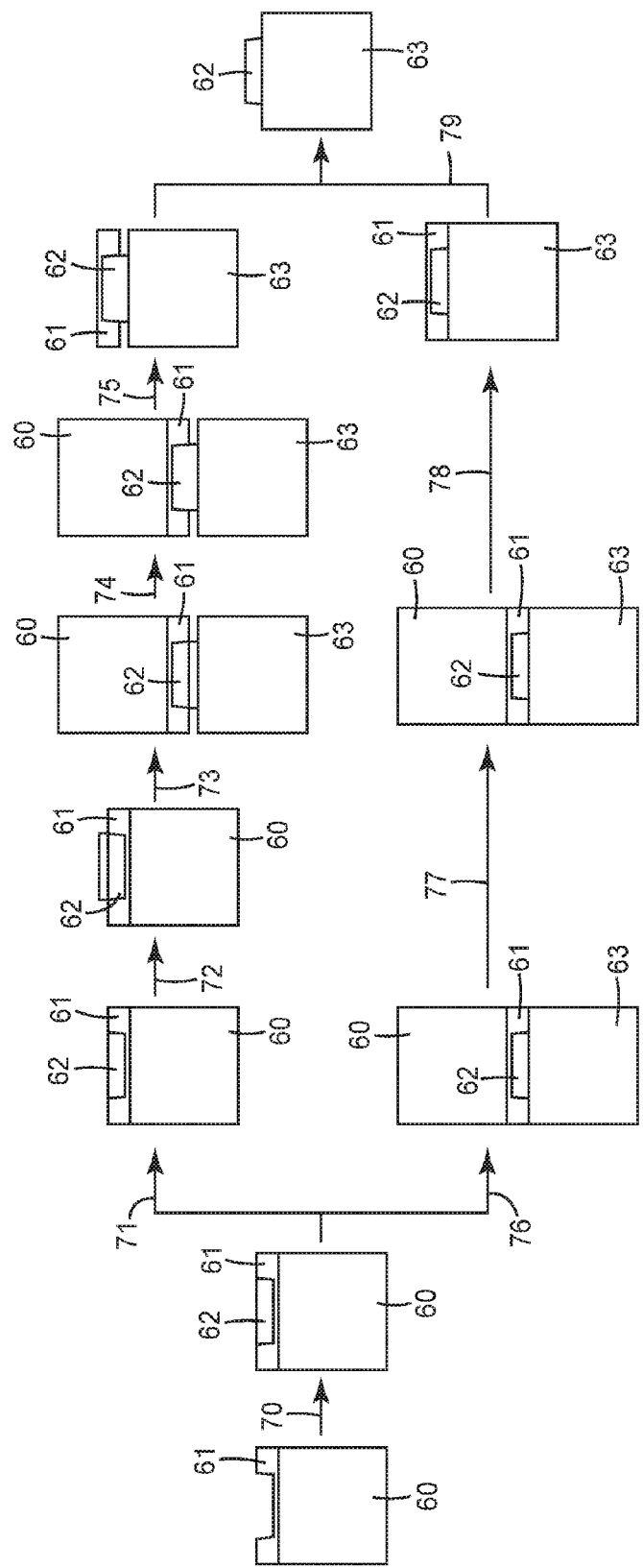
FIG. 7 is a diagram of a pillar delivery film and method having a sacrificial material mold on a support film.

FIG. 7 is a diagram of a section of a pillar delivery film and method having a sacrificial material mold on a support film. The delivery film includes a mold support film 60 having a sacrificial material mold 61. The mold support film 60 may be the sacrificial mold 61. Mold 61 is filled with a curable pillar resin 62 to form a filled mold on mold support film 60 (step 70). The resin material is cured (step 71), and uncured pillar resin is deposited on the cured resin material (step 72). Mold support film 60 is laminated to glass 63 (step 73), and the film and glass laminate is cured (step 74). Mold support film 60 is removed, leaving sacrificial material mold 61 on resin pillar 62 (step 75). The sacrificial material is baked out (step 79), resulting in pillar 62 on glass 63. Alternatively, mold support film 60 is laminated to glass 63 without the uncured pillar resin (step 76), and the film and glass laminate is cured (step 77). Mold support film 60 is removed, leaving sacrificial material mold 61 on resin pillar 62 (step 78). The sacrificial material is baked out (step 79), resulting in pillar 62 on glass 63.

Figure 8:
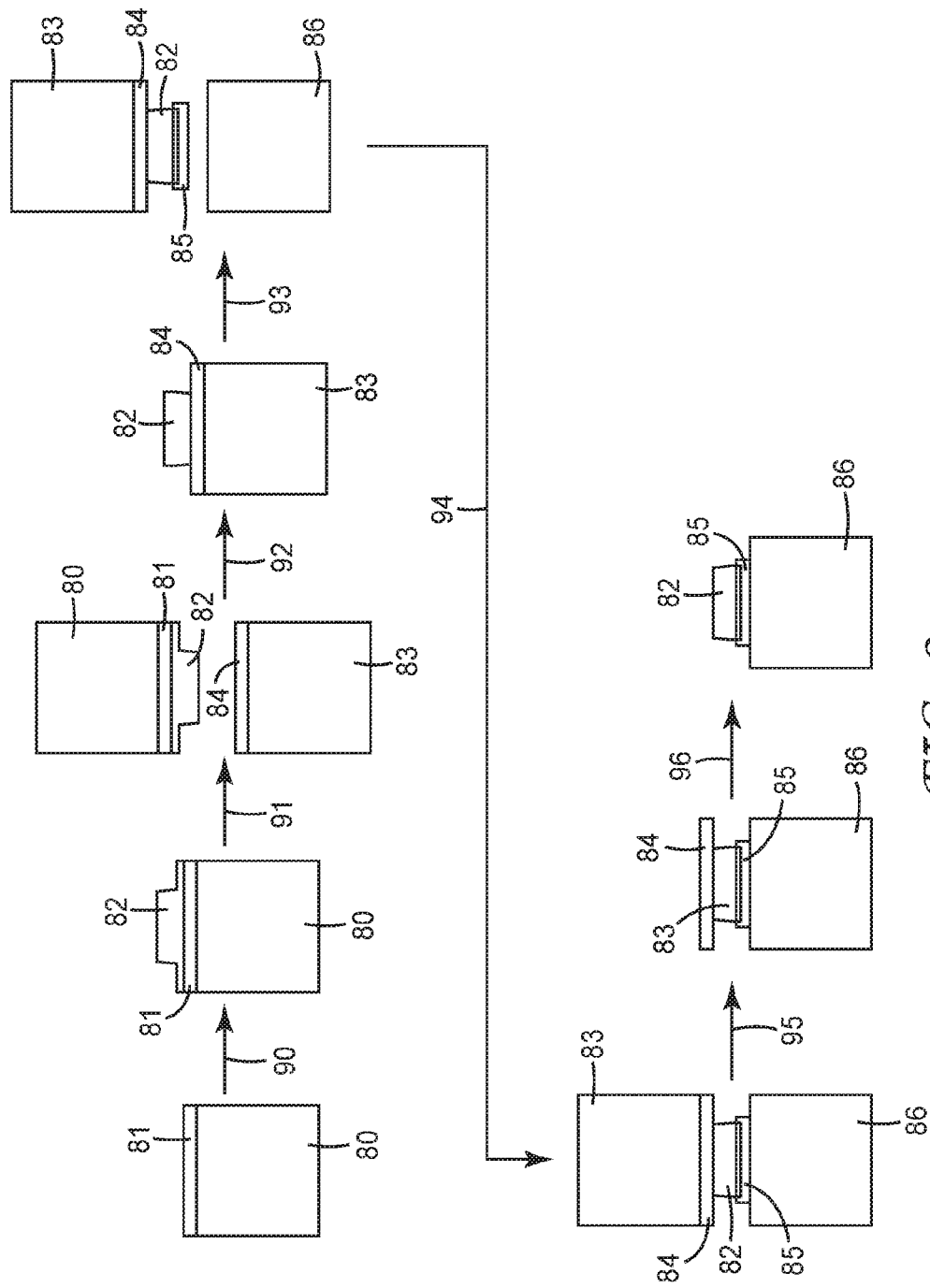
FIG. 8 is a diagram of a pillar delivery film and method for transfer to a sacrificial material layer on a support film.

FIG. 8 is a diagram of a section of a pillar delivery film and method for transfer to a sacrificial material layer on a transfer film and lamination to glass. A support film 80 includes a release surface or coating 81. Using a continuous cast and cure process, a pillar 82 is formed on support film 80 (step 90), and support film 80 with pillar 82 is laminated to a transfer film 83 having a sacrificial material coating 84 (step 91). Support film 80 is removed, transferring pillar 82 to transfer film 83 (step 92). An optional adhesive 85 can be applied to pillar 82 (step 93). Transfer film 83 is laminated to glass 86 (step 94), and transfer film 83 is removed (step 95). Sacrificial material 84 is removed (step 96), resulting in pillar 82 on glass 86 with optional adhesive 85. As illustrated, pillars 82 can be partially embedded within optional adhesive 85.

Figure 9:
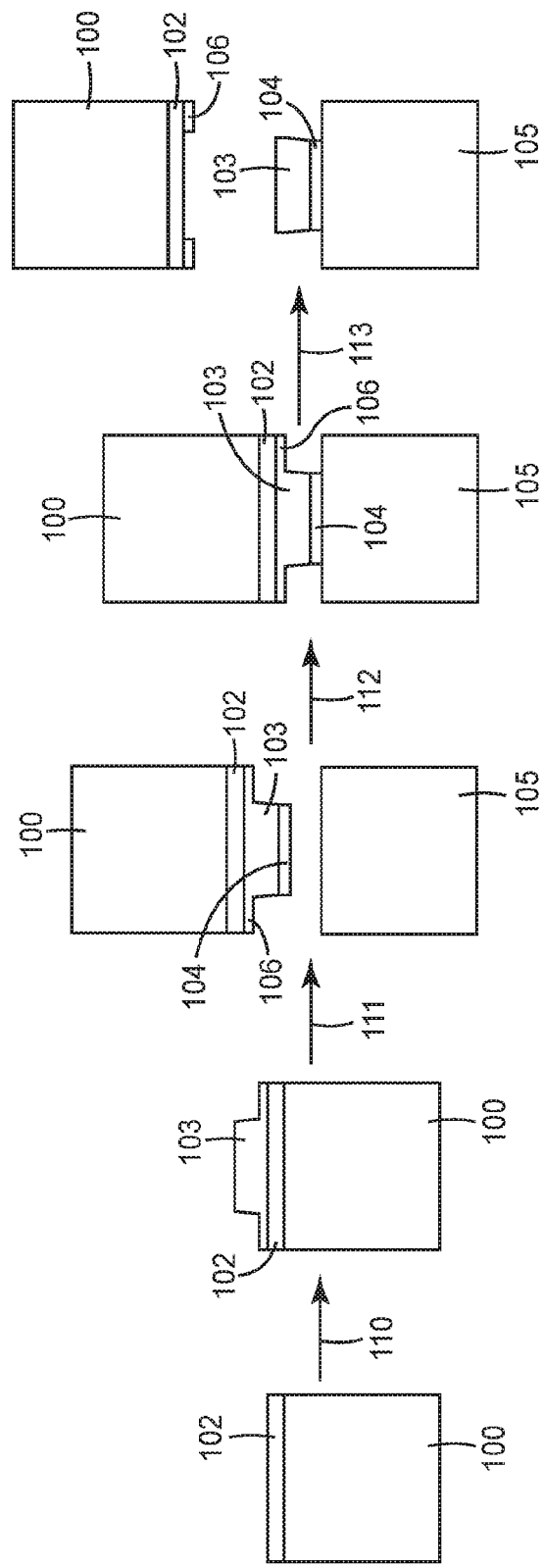
FIG. 9 is a diagram of a pillar delivery film and method for transfer to a sacrificial material layer on a support film.

FIG. 9 is a diagram of a section of a pillar delivery film and method for transfer to a sacrificial material layer on a support film. The delivery film includes a support film 100 with a release surface or coating 102. Using a continuous cast and cure process, a pillar 103 is formed on support film 100 (step 110) with a pillar land 106 between pillars, and an adhesive 104 is deposited on pillar 103 (step 111). Support film 100 with pillar 103 is laminated to glass 105 (step 112). Support film 100 is removed (step 113), resulting in removal of pillar land 106 and transfer of pillar 103 to glass 105 with adhesive 104.

Figure 10:
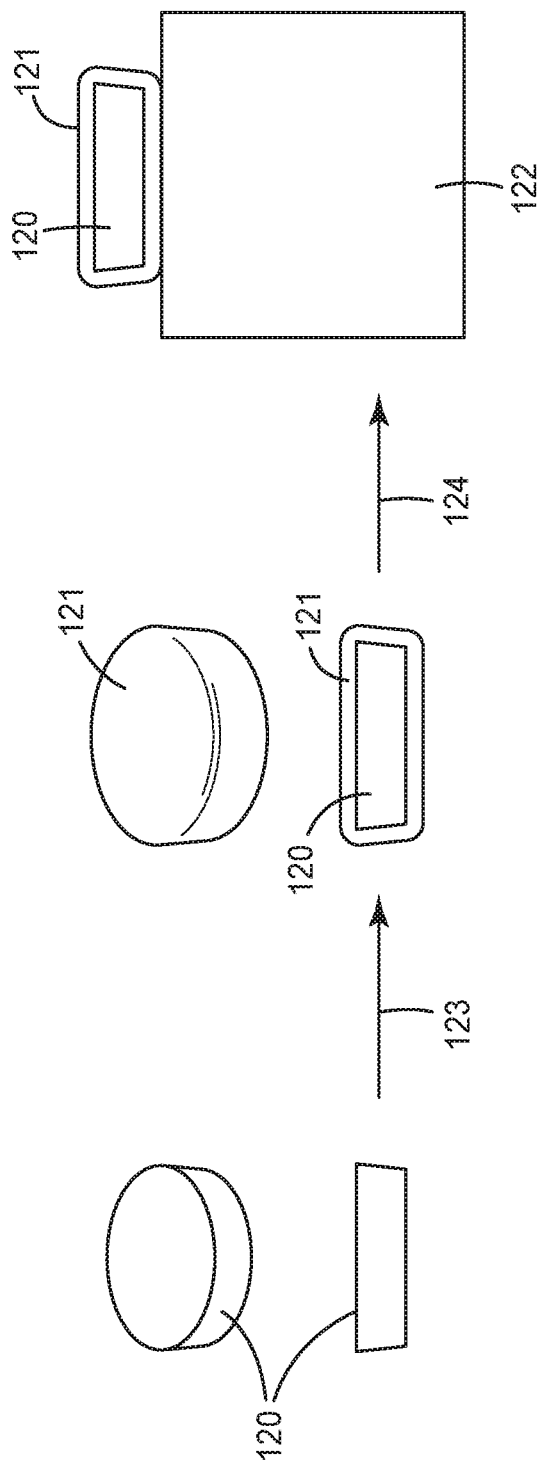
FIG. 10 is a diagram of coated pre-formed pillars.

FIG. 10 is a diagram of coated pre-formed pillars. A pre-formed pillar 120 is coated in a wet or dry coating process (step 123) to form a coating 121 surrounding pillar 120. The coated pillar can then be transferred to glass 122 using, for example, the methods described above. Additional functional layers can also be optionally added to the coated pillar. Coating 121 can include, for example, an adhesive coating, an silsesquioxane precursor with nanoparticles, or a polymer derived ceramic.

Figure 11:
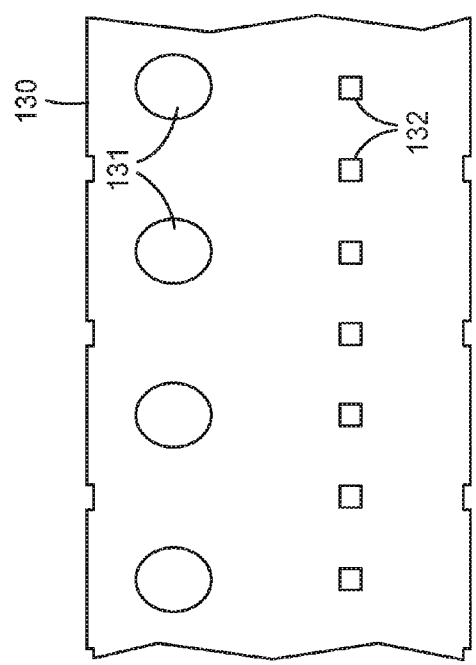
FIG. 11 is a top view of pocket tape for delivering pillars.
Figure 12:
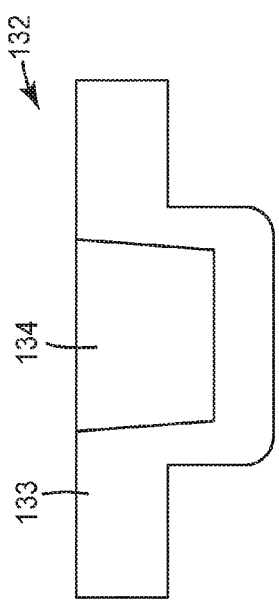
FIG. 12 is a side sectional view of a portion of the pocket tape.

FIG. 11 is a top view of pocket tape 130 for delivering pillars. Pocket tape 130 typically includes holes 131 to engage machine gears. Material pockets 132 are formed in pocket tape 130. FIG. 12 is a side sectional view of a portion of the pocket tape 130 having pockets 132. Pocket 132 includes a film portion 133 and a pocket portion 134 for using in forming, transferring, and delivering, pillars.

FIGS. 13A-19A are side sectional views of various pocket tapes used to form pillars, and FIGS. 13B-19B are perspective views of the resulting pillars. FIG. 13A is a side sectional view of a pocket tape 140 having pre-formed pillars 141 (FIG. 13B). FIG. 14A is a side sectional view of a pocket tape 142 having cured form-in-place pillars 143 (FIG. 14B). FIG. 15A is a side sectional view of a pocket tape 144 having cured form-in-place pillars 145 with an adhesive 146 (FIG. 15B). FIG. 16A is a side sectional view of a pocket tape 147 having cured form-in-place pillars 148 with adhesive 151 and adhesive retention rings 149 to limit the lateral spread of the adhesive (FIG. 16B) and a liner 150. FIG. 17A is a side sectional view of a pocket tape 151, formed from a sacrificial material, having cured form-in-place pillars 152 (FIG. 17B). FIG. 18A is a side sectional view of carrier film tape 153 and a sacrificial pocket tape 155 having cured form-in-place pillars 154 (FIG. 18B). FIG. 19A is a side sectional view of a pocket tape 156 having cured form-in-place pillars 157 in pockets formed from a sacrificial material 158 (FIG. 19B).

FIG. 20 is a diagram of a section of a pillar delivery film and method using a strippable tool 160 composed of a strippable film molds 161. The delivery film includes a support film 162 having a sacrificial material 163. Strippable tool 160 is laminated to support film 162 to create molds (step 170), and a curable pillar paste 164 is coated onto support film 162 (step 171), creating curable pillar 164A and land 164B. The filled support film 162 is cured (step 172), and an adhesive 165 is coated onto cured pillar 164 (step 173), creating an adhesive coating 165A on the cured pillar 164A and an adhesive coating 165B on the cured land 164B. Strippable tool 160 is removed (step 174), taking with it cured land 164B and adhesive 165B, resulting in zero land pillar transfer film having pillar 164A on sacrificial material 163 and adhesive 165A.

FIG. 21 is a diagram of a section of a pillar delivery film and method using a strippable tool 180 composed of a strippable film molds 181 with a sacrificial material layer 183. The delivery film includes a support film 182. Strippable tool 180 is laminated to support film 182 (step 190), and a curable pillar paste 184 is coated onto support film 182 (step 191), creating curable pillar 184A and land 184B. The filled support film 182 is cured (step 192), and an adhesive 185 is coated onto cured pillar 184 (step 193), creating an adhesive coating 185A on the cured pillar 184A and an adhesive coating 185B on the cured land 184B. Strippable tool 180 is removed (step 194), taking with it cured land 184B and adhesive 185B, resulting in a zero land pillar transfer film having pillar 184A and sacrificial material 183 on support film 182 and adhesive 185A on pillar 184A.

Figure 22:
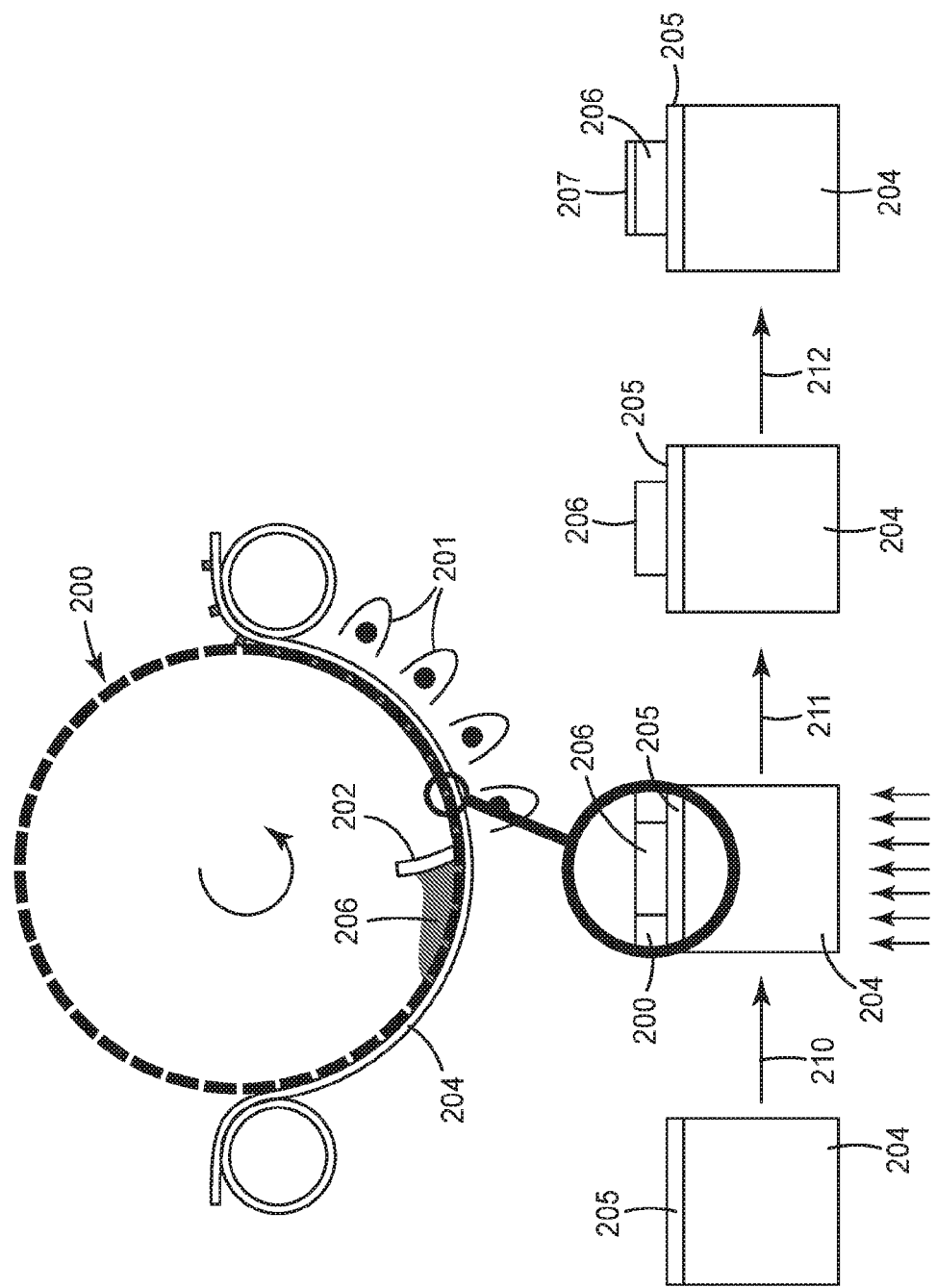
FIG. 22 is a diagram of a pillar delivery film and method using a rotary tool.

FIG. 22 is a diagram of a pillar delivery film and method using a rotary tool having an opaque perforated rotary mold tool 200 and curing units 201. The delivery film includes a support film 204 having a sacrificial material 205. A pillar material 206 is applied to support film 204 through perforated rotary mold tool 200 and cured by curing units 201 (step 210), resulting in formed pillars on support film 204 when removed from perforated rotary mold tool 200 (step 211). An adhesive 207 is coated on pillar 206 (step 212), resulting in zero land pillar transfer film having pillar 206 on sacrificial material 205 and support film 204 and with adhesive 207.

Figure 23:
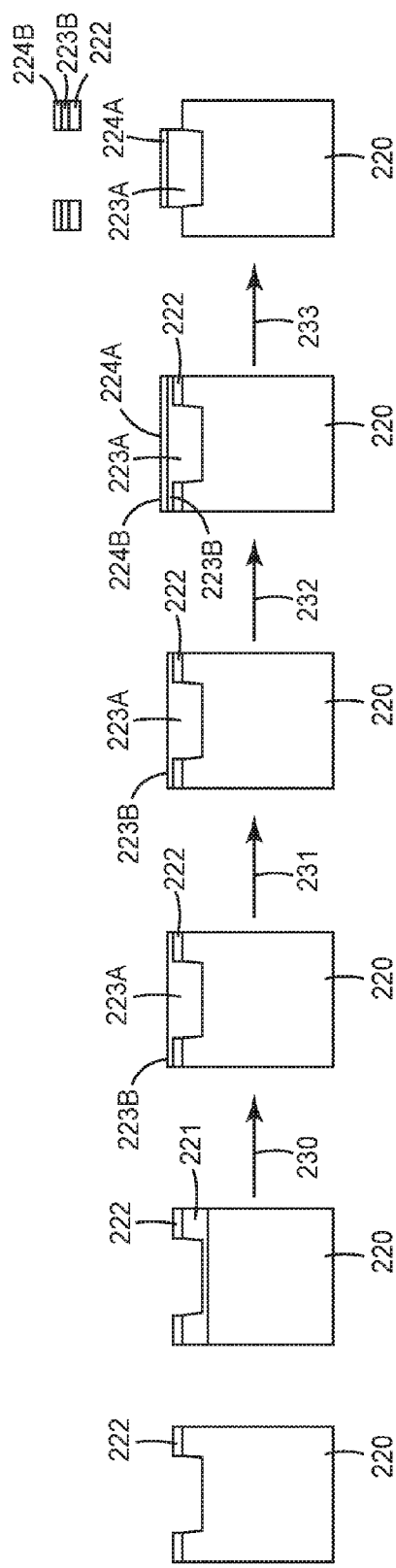
FIG. 23 is a diagram of a pillar delivery film and method using a strippable skin.

FIG. 23 is a diagram of a section of a pillar delivery film and method using a strippable skin, which is a type of strippable tool. The delivery film includes a structured film mold 220 with a strippable skin 222 or a replicated resin mold 221 on film 220 with strippable skin 222. A curable pillar paste 223 is coated onto the mold film 220 (step 230), creating curable pillar 223A and land 223B, the filled mold film 220 is cured (step 231), and an adhesive 224 is coated on cured pillar 223 (step 232), creating an adhesive coating 224A on the cured pillar 223A and an adhesive coating 224B on the cured land 223B. Strippable skin 222 is removed (step 233), taking with it cured land 223B and adhesive 224B, resulting in a zero land pillar transfer film having pillar 223 on support film 220 and with an adhesive 224.

In the fabrication processes described above, additional or supplemental steps can be used within the described steps. In the processes described above, or other processes of the present invention, the sacrificial material can be removed by being cleanly baked out or by being otherwise capable of removal. The term "cleanly baked out" means that the sacrificial material can be removed by pyrolysis or combustion without leaving a substantial amount of residual material such as ash. In some of the side sectional views of the delivery films described above, only one mold and corresponding pillar are shown for illustrative purposes only. The delivery films typically include many of the molds and pillars for delivery of the pillars to vacuum insulated glass units.

Exemplary materials for the processes described above are provided in the Examples. Exemplary materials for the pillars for the vacuum insulated glass units include the following: ceramic nanoparticles; ceramic precursors; sintered ceramic; glass ceramic; glass frit; glass beads or bubbles; metal; or combinations thereof.

EXAMPLES

| Materials | | |
|---|---|---|
| Abbreviation or Trade Designation | Description | Available from |
| FILTEK Supreme+ 5032W 2009-04 | paste | 3M Company, St. Paul, MN |
| QPAC 40 | poly (alkylene carbonate) copolymer | Empower Materials, Inc., New Castle, DE |
| QPAC 100 | poly (alkylene carbonate) copolymer | Empower Materials, Inc., New Castle, DE |
| QPAC 130 | poly (alkylene carbonate) copolymer | Empower Materials, Inc., New Castle, DE |
| T50 | silicon release liner | Solutia Inc., St. Louis, MO |

Example 1

Replicated Mold of Sacrificial Material

A coating solution was prepared by dissolving enough of QPAC 40 in 1,3-dioxolane to produce a final weight percent of 30% QPAC 40. The coating solution was hand coated on the backside of a 0.051 mm (0.002 inch) thick T50 silicone release liner in a notch bar coater. Approximately 50 milliliters of the coating solution was applied to the T50 backside and pulled through a notch bar coater set with a gap of 0.024 inches. The coating was dried at ambient for 1 hour.

The coated film was placed on a hotplate coating side up and held at 50° C. until heated. A tool containing square protrusions on a 0.132 cm pitch was placed onto the coated film, protrusion side down. Individual square posts on this tool tapered at 6 degrees from 296 um at the base to 227 um at the top, and were 305 um tall. A 4.6 kg weight was placed onto the top of the tool, embossing the coating. The tool was allowed to contact the film at temperature for 5 minutes. The weight was removed from the tool and the assembly was removed from the hotplate, and allowed to return to room temperature. The tool was then removed. The coated film now contained wells in the coating that corresponded to the protrusions on the tool.

The wells in the film were then filled with FILTEK Supreme+ 5032W 2009-04 by applying the FILTEK Supreme+ paste to the film and doctoring off the excess with a spatula. The filled sample was then laminated to a clean glass slide at room temperature with a silicone hand roller. The resulting laminate was then cured under germicidal lamps for five minutes. The T50 liner was then removed, leaving cast posts attached to the glass slide, surrounded by the sacrificial mold.

Example 2

Replicated Mold of Sacrificial Material with Adhesive

A coating solution was prepared by dissolving enough of QPAC 40 in 1,3-dioxolane to produce a final weight percent of 30% QPAC 40. The coating solution was hand coated on the backside of a 0.051 mm (0.002 inch) thick T50 silicone release liner in a notch bar coater. Approximately 50 milliliters of the coating solution was applied to the T50 backside and pulled through a notch bar coater set with a gap of 0.024 inches. The coating was dried at ambient for 1 hour.

The coated film was placed on a hotplate coating side up and held at 50° C. until heated. A tool containing square protrusions on a 0.132 cm pitch was placed onto the coated film, protrusion side down. Individual square posts on this tool tapered at 6 degrees from 296 um at the base to 227 um at the top, and were 305 um tall. A 4.6 kg weight was placed onto the top of the tool, embossing the coating. The tool was allowed to contact the film at temperature for 5 minutes. The weight was removed from the tool and the assembly was removed from the hotplate, and allowed to return to room temperature. The tool was then removed. The coated film now contained wells in the coating that corresponded to the protrusions on the tool.

The wells in the film were then filled with FILTEK Supreme+ 5032W 2009-04 by applying the FILTEK Supreme+paste to the film and doctoring off the excess with a spatula. The resulting laminate was then cured under germicidal lamps for five minutes. A second layer of FILTEK Supreme+ 5032W 2009-04 by applying the FILTEK Supreme+ paste to the film and doctoring off the excess with a spatula, leaving a thin layer of uncured FILTEK Supreme+ paste on top of the cured layer, imparting adhesion to the sample.

The sample was then laminated to a clean glass slide at room temperature with a silicone hand roller. The resulting laminate was then cured under germicidal lamps for five minutes. The T50 liner was then removed, leaving cast posts attached to the glass slide, surrounded by the sacrificial mold.

Example 3

Particle Delivery Film

A coating solution was prepared by dissolving enough of QPAC 40 in 1-3 dioxolane to produce a final weight percent of 5% QPAC 40. The coating solution was delivered at a rate of 30 cm³/min to a 10.2 cm (4 inch) wide slot-type coating die. After the solution was coated on the backside of a 0.051 mm (0.002 inch) thick T50 silicon release liner, the coated web travelled approximately 2.4 m (8 ft) before entering a 9.1 m (30 ft) conventional air floatation drier with all 3 zones set at 65.5° C. (150° F.). The substrate was moving at a speed of 3.05 m/min (10 ft/min) to achieve a wet coating thickness of about 80 micrometers.

A piece of the coated film slightly larger than 6 in×6 in was placed on a hotplate held at 50° C. Grade 36+ shaped abrasive particles prepared according to the disclosure of U.S. Pat. No. 8,142,531 having a side length of about 0.8 mm and about 0.2 mm thick, and a sidewall angle of 98 degrees. The particles were pressed into the heated film in a grid with 2 cm spacing, creating a particle delivery film. The particle delivery film was removed from the hotplate and brought to room temperature.

The cooled particle delivery film was laminated at 230 F, coating and particle side down to a 0.125 inch thick 6 in×6 in section of glass using a thermal film laminator (GBC Catena 35, GBC Document Finishing, Lincolnshire, Ill.). The laminated sample was allowed to cool to room temperature. The T50 liner was then removed, leaving the particles arranged on the substrate.

Example 4

Particle Delivery Film with Integrated Edge Seal

A coating solution was prepared by dissolving enough of QPAC 40 in 1-3 dioxolane to produce a final weight percent of 5% QPAC 40. The coating solution was delivered at a rate of 30 cm³/min to a 10.2 cm (4 inch) wide slot-type coating die. After the solution was coated on the backside of a 0.051 mm (0.002 inch) thick T50 silicon release liner, the coated film travelled approximately 2.4 m (8 ft) before entering a 9.1 m (30 ft) conventional air floatation drier with all 3 zones set at 65.5° C. (150° F.). The substrate was moving at a speed of 3.05 m/min (10 ft/min) to achieve a coated film with a wet coating thickness of about 80 micrometers.

A slurry was prepared consisting of glass particles and QPAC 40 in MEK. A screen-print mesh was prepared by masking a 5.75 in×5.75 in square with tape on the top of the screen. A second solid square 5.25 in×5.25 in was created with tape and centered in the first square to create a square opening in the mesh 0.25 in wide. A section of the coated film larger than 6 in×6 in was placed under the screen, and the screen pressed and held against the coated film with weights. The prepared slurry was forced through the opening in the screen-print mesh with foam applicators. The screen was removed, and the slurry was allowed to dry overnight at room temperature, creating an edge seal delivery film.

A piece of the edge seal delivery film slightly larger than 6 in×6 in was placed on a hotplate held at 50° C. Grade 36+ shaped abrasive particles prepared according to the disclosure of U.S. Pat. No. 8,142,531 having a side length of about 0.8mm and about 0.2 mm thick, and a sidewall angle of 98 degrees. The particles were pressed into the heated film in a grid with 2 cm spacing, creating a particle delivery film. The particle and edge seal delivery film was removed from the hotplate and brought to room temperature.

The cooled particle and edge seal delivery film was laminated at 230° F., coating and particle side down to a 0.125 inch thick 6 in×6 in section of glass using a thermal film laminator (GBC Catena 35, GBC Document Finishing, Lincolnshire, Ill.). The laminated sample was allowed to cool to room temperature. The T50 liner was then removed, leaving the particles arranged on the substrate, and the edge seal arranged around the perimeter of the glass.

Example 5

Landless Replication Via Mask Method

A coating solution was prepared by dissolving enough of QPAC 40 in 1-3-dioxolane to produce a final weight percent of 5% QPAC 40. The coating solution was delivered at a rate of 30 cm$^3$/min to a 10.2 cm (4 inch) wide slot-type coating die. After the solution was coated on the backside of a 0.051 mm (0.002 inch) thick T50 silicon release liner, the coated film travelled approximately 2.4 m (8 ft) before entering a 9.1 m (30 ft) conventional air floatation drier with all 3 zones set at 65.5° C. (150° F.). The substrate was moving at a speed of 3.05 m/min (10 ft/min) to achieve coated film with a wet coating thickness of about 80 micrometers.

A 2 mil perforated film was prepared by laser cutting (LaseX, Inc., White Bear Lake, Minn.) 500 micron diameter holes spaced on 2 cm centers into an 0.008 inch polypropylene film. The perforated film was laminated at 230° F., coating side down to a section of the coated film using a thermal film laminator (GBC Catena 35, GBC Document Finishing, Lincolnshire, Ill.). The laminated sample was allowed to cool to room temperature.

The wells in the film were then filled with FILTEK Supreme+ 5032W 2009-04 by applying the FILTEK Supreme+ paste to the film and doctoring off the excess with the edge of a glass microscope slide. The resulting film was then cured under germicidal lamps for five minutes.

The perforated film was peeled off of the substrate, leaving a particle delivery film that contained particles of cured FILTEK Supreme+ paste in the size and position of the holes in the perforated film.

The cooled particle delivery film was laminated at 230° F., coating and particle side down to a glass microscope slide using a thermal film laminator (GBC Catena 35, GBC Document Finishing, Lincolnshire, Ill.). The laminated sample was allowed to cool to room temperature. The T50 substrate was then removed, leaving the particles arranged on the glass, held by the QPAC 40 layer.

Example 6

Landless Replication with Adhesive Layer Via Mask Method

A coating solution was prepared by dissolving enough of QPAC 40 in 1-3 dioxolane to produce a final weight percent of 5% QPAC 40. The coating solution was delivered at a rate of 30 cm$^3$/min to a 10.2 cm (4 inch) wide slot-type coating die. After the solution was coated on the backside of a 0.051 mm (0.002 inch) thick T50 silicon release liner, the coated film travelled approximately 2.4 m (8 ft) before entering a 9.1 m (30 ft) conventional air floatation drier with all 3 zones set at 65.5° C. (150° F.). The substrate was moving at a speed of 3.05 m/min (10 ft/min) to achieve coated film with a wet coating thickness of about 80 micrometers.

A 2 mil perforated film was prepared by laser cutting (LaseX, Inc., White Bear Lake, Minn.) 500 micron diameter holes spaced on 2 cm centers into an 0.008 inch polypropylene film. The perforated film was laminated at 230° F., coating side down to a section of the previously coated film using a thermal film laminator (GBC Catena 35, GBC Document Finishing, Lincolnshire, Ill.). The laminated sample was allowed to cool to room temperature.

The wells in the film were then filled with FILTEK Supreme+ 5032W 2009-04 by applying the FILTEK Supreme+ paste to the film and doctoring off the excess with the edge of a glass microscope slide. The resulting film was then cured under germicidal lamps for five minutes. A second layer of FILTEK Supreme+ 5032W 2009-04 by applying the FILTEK Supreme+ paste to the film and doctoring off the excess with a spatula, leaving a thin layer of uncured FILTEK Supreme+ paste on top of the cured layer, imparting adhesion to the sample.

The perforated film was peeled off of the substrate, leaving a particle delivery film that contained particles of cured FILTEK Supreme+ paste in the size and position of the holes in the film, with a thin layer of uncured FILTEK Supreme+ paste on the top of the columns.

The cooled particle delivery film was laminated at 230° F., coating and particle side down to a glass microscope slide using a thermal film laminator (GBC Catena 35, GBC Document Finishing, Lincolnshire, Ill.). The laminated sample was allowed to cool to room temperature. The resulting laminate was then cured under germicidal lamps for five minutes. The T50 liner and QPAC 40 substrate was then removed, leaving the particles arranged on the glass.

Example 7

Coated Encapsulated Pillars

A particle delivery film was created by applying FILTEK Supreme+ paste drop wise to 2 mil unprimed PET and grade 36+ shaped abrasive particles prepared according to the disclosure of U.S. Pat. No. 8,142,531 having a side length of about 0.8 mm and about 0.2 mm thick, and a sidewall angle of 98 degrees. The particles were pressed into the resin. The sample was crosslinked using 4 passes of ultraviolet irradiation (RPC Industries UV Processor QC 120233AN/DR, Plainfield, Ill.) at 50 f pm in air. Any excess resin surrounding the pillars was removed using a razor blade to create planarized pillars. The planarized pillars were released from the PET by flexing it in a tight radius.

A light microscope image at 50× of the FILTEK Supreme+ paste planarized slip cast pillar showed that the pillar appeared as a light core with an opaque nanoparticle resin planarizing one surface.

The invention claimed is:

1. A method for transferring pillars from a delivery film to a receptor surface, comprising:
   providing a delivery film having a support film, a sacrificial material layer on the support film, and a plurality of pillars, wherein each pillar is at least partially embedded within the sacrificial material layer, each pillar includes a draft angle α between a face and a sloping sidewall and the draft angle is between about 95° to about 130° degrees;
   laminating the delivery film to a receptor surface with the pillars facing the receptor surface;

removing the support film while leaving the pillars on the receptor surface and at least a portion of the sacrificial material on the pillars;

wherein the sacrificial material layer is discontinuous and in discrete regions around the pillars and removing the sacrificial material while leaving the pillars remaining and substantially intact on the receptor surface.

2. The method of claim 1, wherein the providing step includes:

forming the pillars on the support film from an uncured pillar material; and curing the pillar material.

3. The method of claim 1, wherein the providing step includes forming the pillars within a mold composed of the sacrificial material.

4. The method of claim 1, wherein the providing step includes forming the pillars within pockets formed within the support film.

5. The method of claim 1, wherein the providing step further comprises:

applying an adhesive to an exposed surface of the pillars; and curing the adhesive.

6. The method of claim 1, wherein the providing step comprises:

forming the pillars within a strippable tool applied to the support film; and removing the strippable tool while leaving the pillars substantially intact on the support film.

7. The method of claim 1, wherein the providing step comprises:

forming the pillars through a perforated rotary mold tool applied to the support film; and removing the perforated rotary mold tool while leaving the pillars substantially intact on the support film.

8. The method of claim 1, wherein the providing step further comprises including a release coating on the support film between the support film and the pillars.

* * * * *